US00RE49306E

(19) United States
(12) Reissued Patent
Matsuno et al.

(10) Patent Number: US RE49,306 E
(45) Date of Reissued Patent: Nov. 22, 2022

(54) NON-AQUEOUS ELECTROLYTE SECONDARY BATTERY

(71) Applicant: Kabushiki Kaisha Toshiba, Minato-ku (JP)

(72) Inventors: Shinsuke Matsuno, Tokyo (JP); Hiromichi Kuriyama, Saitama (JP); Hideki Satake, Nagano (JP); Takashi Kuboki, Tokyo (JP)

(73) Assignee: Kabushiki Kaisha Toshiba, Tokyo (JP)

(21) Appl. No.: 16/201,313

(22) Filed: Nov. 27, 2018

Related U.S. Patent Documents

Reissue of:
(64) Patent No.: 9,509,013
Issued: Nov. 29, 2016
Appl. No.: 14/753,836
Filed: Jun. 29, 2015

U.S. Applications:
(60) Division of application No. 13/969,104, filed on Aug. 16, 2013, now abandoned, which is a continuation of
(Continued)

(30) Foreign Application Priority Data

Feb. 18, 2011 (JP) ..... 2011-033448

(51) Int. Cl.
*H01M 10/05* (2010.01)
*H01M 4/13* (2010.01)
(Continued)

(52) U.S. Cl.
CPC ..... *H01M 10/05* (2013.01); *H01M 4/13* (2013.01); *H01M 4/131* (2013.01); *H01M 4/485* (2013.01);
(Continued)

(58) Field of Classification Search
None
See application file for complete search history.

(56) References Cited

U.S. PATENT DOCUMENTS 9,923,192 B2 * 3/2018 Matsuno ..... H01M 4/131
10,490,808 B2 * 11/2019 Matsuno ..... H01M 4/1391
(Continued)

FOREIGN PATENT DOCUMENTS

CN 1585163 A 2/2005
CN 101436660 A 5/2009
(Continued)

OTHER PUBLICATIONS

Office Action dated Jul. 1, 2015 in Chinese Patent Application No. 201280003688.8 with English translation.
(Continued)

*Primary Examiner* — Sean E Vincent
(74) *Attorney, Agent, or Firm* — Maier & Maier, PLLC

(57) ABSTRACT

According to one embodiment, there is provided a non-aqueous electrolyte secondary battery including a positive electrode including a positive electrode active material layer, a negative electrode including a negative electrode active material layer, and a non-aqueous electrolyte. At least one of the positive electrode active material layer and the negative electrode active material layer contains carbon dioxide and releases the carbon dioxide in the range of 0.1 ml to 10 ml per 1 g when heated at 350° C. for 1 minute.

30 Claims, 2 Drawing Sheets

Related U.S. Application Data application No. PCT/JP2012/053071, filed on Feb. 10, 2012.

(51) Int. Cl.

| | |
|---|---|
| ***H01M 4/131*** | (2010.01) |
| ***H01M 4/485*** | (2010.01) |
| ***H01M 4/505*** | (2010.01) |
| ***H01M 4/525*** | (2010.01) |
| ***H01M 4/58*** | (2010.01) |
| ***H01M 10/0525*** | (2010.01) |
| ***H01M 4/02*** | (2006.01) |

(52) U.S. Cl.

CPC ..... *H01M 4/505* (2013.01); *H01M 4/525* (2013.01); *H01M 4/5825* (2013.01); *H01M 10/0525* (2013.01); *H01M 2004/027* (2013.01); *H01M 2004/028* (2013.01); *Y02E 60/10* (2013.01)

(56) References Cited

U.S. PATENT DOCUMENTS

| | | | | |
|---|---|---|---|---|
| 2001/0032386 | A1 | 10/2001 | Yamada et al. | |
| 2005/0069484 | A1 | 3/2005 | Manev et al. | |
| 2007/0204457 | A1* | 9/2007 | Sato | H01M 10/058 29/623.5 |
| 2008/0286643 | A1* | 11/2008 | Iwasaki | B01D 53/326 429/111 |
| 2009/0119908 | A1 | 5/2009 | Takeda et al. | |
| 2009/0305131 | A1 | 12/2009 | Kumar et al. | |
| 2010/0178570 | A1 | 7/2010 | Kozono et al. | |
| 2012/0003541 | A1 | 1/2012 | Song et al. | |

FOREIGN PATENT DOCUMENTS

| | | |
|---|---|---|
| JP | 1-307169 | 12/1989 |
| JP | 11-135121 | 5/1995 |
| JP | 11-339856 | 12/1999 |
| JP | 2001-185140 A | 7/2001 |
| JP | 2002-216843 | 8/2002 |
| JP | 2007-227310 | 9/2007 |
| JP | 2010-238387 | 10/2010 |
| JP | 2011-51891 | 3/2011 |
| JP | 2011-108407 | 6/2011 |
| JP | 2011-113735 | 6/2011 |
| JP | 20111-108407 | 6/2011 |
| JP | 2012-174416 | 9/2012 |

OTHER PUBLICATIONS

Combined Chinese Offce Acton and Search Report dated Nov. 4, 2014 in Patent Application No. 201280003650.5 (wih English language translation).

Combined Chinese Offce Acton and Search Report dated Nov. 15, 2014 in Patent Application No. 201280003688.8 (with English language translation).

International Search Report dated Apr. 24, 2012 in PCT/JP2012/053071 filed on Feb. 10, 2012.

Mark Q. Snyder, et al. "Art Infrared Study of the Surface Chemistry of Lithium Titanate Spinal (Li4Ti5012)". Applied Surface Science 253 (2007), pp. 9336-9341, Jun. 2, 2007.

T. Osaka, et al. "Surface characterization of electrodeposited lithium anode with enhanced cycleability obtained by $CO_2$ addition", Journal of Electrochemical Society, May 5, 1997, pp. 1709-1713, XP055125622.

Office Action in corresponding Japanese Application No. 2011-185187, dated Mar. 17, 2015. (w/English Translation).

Combined Chinese Office Action and Search Report issued Nov. 4, 2014 in Patent Application No. 201280003650.0 (with English language translation).

Office Action in U.S. Appl. No. 13/968,965, dated May 5, 2016.

* cited by examiner

NON-AQUEOUS ELECTROLYTE SECONDARY BATTERY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a Divisional of U.S. application Ser. No. 13/969,104 filed on Aug. 16, 2013, which is a Continuation Application of PCT Application No. PCT/JP2012/053071, filed Feb. 10, 2012, and based upon and claiming the benefit of priority from Japanese Patent Application No. 2011-033448, filed Feb. 18, 2011, the entire contents of which are all incorporated herein by reference.

FIELD

Embodiments described herein relate generally to a non-aqueous electrolyte secondary battery.

BACKGROUND

A lithium ion secondary battery using lithium titanate such as $Li_4Ti_5O_{12}$ as a negative electrode active material has been recently developed. In such a lithium ion secondary battery, it is known that carbon dioxide is adsorbed as an impurity at the negative electrode. Carbon dioxide may react with the negative electrode active material and thereby, produce a large amount of gas. Such a reaction is remarkable particularly when the battery was stored at a temperature equal to or higher than room temperature. If a large amount of gas is generated, the battery internal pressure increases. Further, in such a case, plastic deformation of the battery may occur.

In addition, it is known that an SEI (Solid Electrolyte Interface) coating (hereinafter, referred to as a coating) is formed on the surface of a negative electrode active material of a lithium ion secondary battery. This coating is produced mainly due to the reductive decomposition of a non-aqueous electrolyte. Reaction between an active material and the non-aqueous electrolyte can be suppressed by this coating. However, when the coating is too thick, diffusion resistance of the lithium ion becomes larger. As a result, the large current performance is reduced. On the other hand, when the coating is too thin, the reaction of the non-aqueous electrolyte with the active material is less likely to be suppressed. As a result, self-discharge during storage of the battery is increased.

CITATION LIST

Patent Literature

Patent Literature 1: Jpn. Pat. Appln. KOKAI Publication No. 2002-216843

Patent Literature 2: Jpn. Pat. Appln. KOKAI Publication No. 11-339856

DETAILED DESCRIPTION

There is provided a non-aqueous electrolyte secondary battery which shows a suppression of gas generation during its storage as well as shows a suppression of self-discharge reaction.

In general, according to one embodiment, there is provided a non-aqueous electrolyte secondary battery comprising a positive electrode including a positive electrode active material layer; a negative electrode including a negative electrode active material layer; and a non-aqueous electrolyte. At least one of the positive electrode active material layer and the negative electrode active material layer contains carbon dioxide and releases the carbon dioxide in the range of 0.1 ml to 10 ml per 1 g when heated at 350° C. for 1 minute.

Hereinafter, embodiments will be explained with reference to the drawings.

Figure 1:
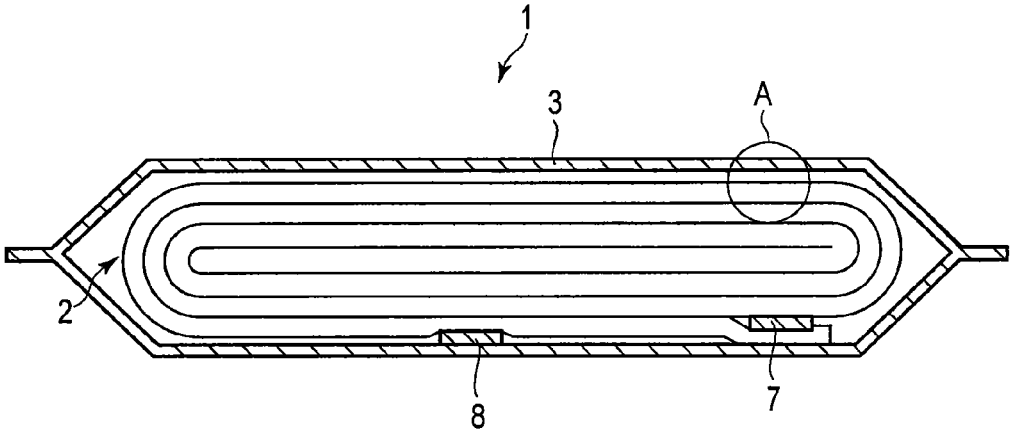
FIG. 1 is a schematic cross-sectional view of a non-aqueous electrolyte secondary battery according to the embodiment.
Figure 2:
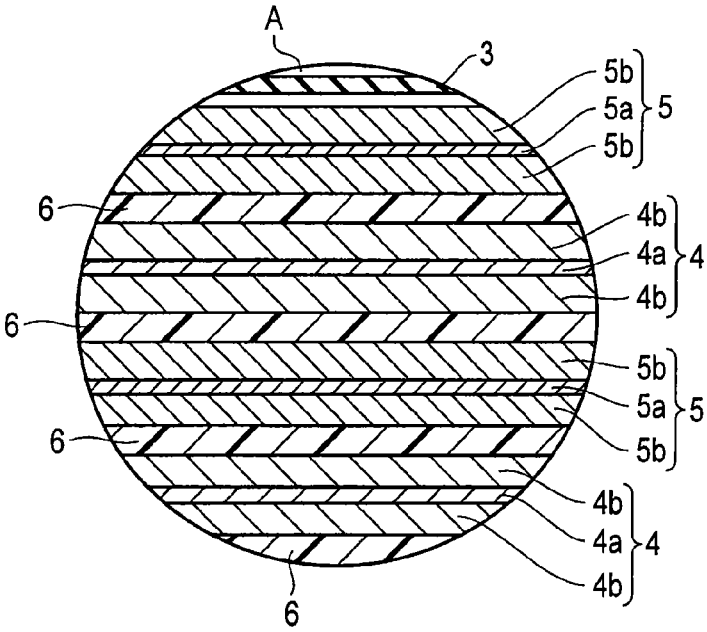
FIG. 2 is an enlarged sectional view of section A shown in FIG. 1.

FIG. 1 is a schematic cross-sectional view of a flat type non-aqueous electrolyte secondary battery. FIG. 2 is an enlarged sectional view of section A in FIG. 1. A battery 1 includes a wound electrode group 2. The wound electrode group 2 is accommodated in a container 3. A non-aqueous electrolyte is also filled in the container 3 (not shown).

The wound electrode group 2, as shown in FIG. 2, is a laminate. In the laminate, a separator 6 is interposed between a positive electrode 4 and a negative electrode 5. A flat type wound electrode group can be obtained by winding the laminate spirally and pressing it.

As shown in FIG. 1, in the vicinity of the circumferential edge of the wound electrode group 2, a positive electrode terminal 7 is connected to the positive electrode 4, and a negative electrode terminal 8 is connected to the negative electrode 5. An exterior bag made of a laminated film is used for the container 3. The wound electrode group 2 and a non-aqueous electrolyte are sealed by heat-sealing an opening of the exterior bag made of a laminated film, in the state where the positive electrode terminal 7 and the negative electrode terminal 8 are extended through the opening. The container 3 is not limited to the exterior bag made of a laminated film, and, for example, it is also possible to use a metal can.

The positive electrode 4 includes a positive electrode current collector 4a and a positive electrode active material layer 4b. The positive electrode active material layer 4b includes a positive electrode active material and optionally a conductive agent and a binder. The positive electrode active material layer 4b is formed on one or both surfaces of the positive electrode current collector 4a.

At least one oxide selected from the group consisting of lithium manganese composite oxide, lithium nickel composite oxide, and lithium composite phosphate compound is preferably used as the positive electrode active material.

Examples of the lithium manganese composite oxide include an oxide such as $LiMn_2O_4$, and another oxide such as $Li(Mn_xAl_y)_2O_4$ (x+y=1) in which a part of Mn is substituted by a hetero element.

Examples of the lithium nickel composite oxide include an oxide such as $LiNiO_2$, and another oxide such as Li(N-

$i_xMn_yCo_z)O_2$ and $Li(Ni_xCo_yAl_z)O_2$ (x+y+z=1) in which a part of Ni is substituted by a hetero element.

Examples of the lithium composite phosphate compound include a phosphate such as $LiFePO_4$, and another phosphate such as $Li(Fe_xMn_y)PO_4$ (x+y=1) in which a part of Fe is substituted by a hetero element.

Examples of the conductive agent include acetylene black, carbon black, and graphite.

Examples of the binder include polytetrafluoroethylene (PTFE), polyvinylidene fluoride (PVdF), fluorine-based rubber, ethylene-butadiene rubber (SBR), polypropylene (PP), polyethylene (PE), and carboxymethyl cellulose (CMC).

The mixing ratio of the positive electrode active material, the conductive agent and the binder is preferably 80 to 95% by mass of the positive electrode active material, 3 to 18% by mass of the conductive agent, and 2 to 7% by mass of the binder.

The positive electrode current collector is preferably an aluminum foil or an aluminum alloy foil containing one or more elements selected from the group consisting of Mg, Ti, Zn, Mn, Fe, Cu and Si.

The negative electrode 5 includes a negative electrode current collector 5a and a negative electrode active material layer 5b. The negative electrode active material layer 5b includes a negative electrode active material and optionally a conductive agent and a binder. The negative electrode active material layer 5b is formed on one or both surfaces of the negative electrode current collector 5a.

Lithium titanium composite oxide is preferably used as the negative electrode active material. It is more preferable to use a lithium titanium composite oxide having a lithium ion absorption potential of 0.4 V or more (vs. $Li/Li^+$) as the negative electrode active material. Examples of such lithium titanium composite oxide include lithium titanate ($Li_{4+x}Ti_5O_{12}$) having a spinel structure, and lithium titanate ($Li_{2+x}Ti_3O_7$) having a ramsdellite structure. These lithium titanium oxides may be used alone or as a mixture of two or more thereof. Further, titanium oxide (e.g., $TiO_2$) that becomes lithium titanium oxide by charge and discharge may be used as the negative electrode active material.

The average primary particle diameter of the lithium titanium composite oxide is preferably 5 μm or less. If the average primary particle diameter is 5 μm or less, superior large current discharge performance can be obtained because an effective area to contribute to the electrode reaction is sufficient.

In addition, the specific surface area of the lithium titanium composite oxide is preferably 1 to 10 $m^2/g$. If the specific surface area is 1 $m^2/g$ or more, it is possible to obtain superior large current discharge performance because an effective area to contribute to the electrode reaction is sufficient. On the other hand, if the specific surface area is 10 $m^2/g$ or less, the reaction with the non-aqueous electrolyte is suppressed, and thus it is possible to suppress decrease in charge and discharge efficiency and gas generation.

Examples of the conductive agent include a carbonaceous material, such as acetylene black, carbon black, and graphite. It is preferable to use a carbonaceous material having a high absorption of alkali metal and a high conductivity.

Examples of the binder include polytetrafluoroethylene (PTFE), polyvinylidene fluoride (PVdF), fluorine-based rubber, styrene-butadiene rubber (SBR), polypropylene (PP), polyethylene (PE), and carboxymethyl cellulose (CMC).

The mixing ratio of the negative electrode active material, the conductive agent and the binder is preferably 70 to 95% by mass of the negative electrode active material, 0 to 25% by mass of the conductive agent, and 2 to 10% by mass of the binder.

The negative electrode current collector is preferably an aluminum foil, an aluminum alloy foil containing one or more elements selected from the group consisting of Mg, Ti, Zn, Mn, Fe, Cu and Si, or a copper foil.

The non-aqueous electrolyte is prepared by dissolving an electrolyte in a non-aqueous solvent. The concentration of the electrolyte in the non-aqueous solvent is preferably 0.5 to 2 mol/L.

Known non-aqueous solvents used in lithium batteries can be used as the non-aqueous solvent. Examples of the non-aqueous solvent include a cyclic carbonate such as ethylene carbonate (EC) and propylene carbonate (PC), and a mixed solvent of a cyclic carbonate and a non-aqueous solvent having a lower viscosity than the cyclic carbonate (hereinafter referred to as "second solvent").

Examples of the second solvent include a linear carbonate (e.g., dimethyl carbonate, methyl ethyl carbonate or diethyl carbonate); γ-butyrolactone, acetonitrile, methyl propionate, ethyl propionate; a cyclic ether (e.g., tetrahydrofuran or 2-methyltetrahydrofuran); and a linear ether (e.g., dimethoxyethane or diethoxyethane).

As the electrolyte, an alkali salt can be used. Preferably, a lithium salt is used. Examples of the lithium salt include lithium hexafluorophosphate ($LiPF_6$), lithium tetrafluoroborate ($LiBF_4$), lithium hexafluoroarsenate ($LiAsF_6$), lithium perchlorate ($LiClO_4$), and lithium trifluoromethanesulfonate ($LiCF_3SO_3$). In particular, lithium hexafluorophosphate ($LiPF_6$) and lithium tetrafluoroborate ($LiBF_4$) are preferable.

A separator 6 prevents physical and electrical contact of the positive electrode 4 with the negative electrode 5. The separator 6 is comprised of an insulating material, and has a shape enabling an electrolyte to permeate through it. The separator 6 may be formed from, for example, a non-woven fabric made of synthetic resin, a porous polyethylene film, a porous polypropylene film, or a cellulose-based separator.

The positive electrode active material layer and the negative electrode active material layer may contain carbon dioxide as an impurity. According to the embodiment, at least one of the positive electrode active material layer and the negative electrode active material layer contains carbon dioxide in an amount capable of releasing the carbon dioxide in the range of 0.1 ml to 10 ml per 1 g when heated at 350° C. for 1 minute.

The carbon dioxide is contained in a state of being adsorbed on an active material, or as a compound such as lithium carbonate. The carbon dioxide contained in the negative electrode may be reduction by charge and discharge on the surface of the active material and thereby released as CO gas. On the other hand, it is considered that carbon dioxide contained in the positive electrode may move to the negative electrode and be reduced, then released as CO gas.

In addition to release as a gas, carbon dioxide reacts with a lithium ion in the electrolyte, or reacts with the negative electrode active material such as a lithium titanium composite oxide, thereby producing $Li_2CO_3$ (lithium carbonate). The lithium carbonate is considered to form an inorganic coating and to have an effect of promoting the generation of an organic polymer. Thus, if the carbon dioxide is contained in the active material layer, coating formation is promoted and self-discharge is suppressed. On the other hand, if the amount of carbon dioxide is too much, a large amount of gas generates and the coating becomes thicker, resulting in the decrease of the rate performance.

However, suppression of gas generation as well as formation of suitable coatings can be attained by containing carbon dioxide in an amount within the above range in the active material layer of at least one of the positive electrode and the negative electrode. If the content of carbon dioxide is too little, a stable coating is hardly produced. On the other hand, if the content of carbon dioxide is too much, gas generation is remarkable when batteries are stored at a high temperature.

The amount of carbon dioxide contained in the active material layer can be measured by gas chromatography (GC). In the embodiment, the amount of carbon dioxide generated when the active material layer was maintained at 350° C. for 1 minute is measured. In the case where heating is carried out at a temperature exceeding 350° C. or heating time is more than 1 minute, the conductive agent and the binder may undergo thermal decomposition or combustion, which may cause the generation of carbon dioxide. Therefore, in this case, carbon dioxide other than the carbon dioxide contained as an impurity may also be measured.

GC measurement can be carried out as follows. Using a spatula or the like, several mg of the active material layer is scraped out from the electrode, and placed in a measurement container. This operation is carried out in a glove box under an inert gas atmosphere. As for such inert gas, an inert gas such as nitrogen and argon other than carbon dioxide is used. Then, the measurement container is introduced into a device while maintaining the inert gas atmosphere, then, the amount of carbon dioxide generated when heating is carried out at 350° C. for 1 minute is measured. The measurement is performed under an inert gas atmosphere so that the active material layer will not adsorb carbon dioxide and moisture.

Measurement of the active material layer in a non-aqueous electrolyte secondary battery is performed as follows. At first a battery is dismantled in an inert gas atmosphere to take out an electrode. This electrode is washed with methyl ethyl carbonate (MEC) for 10 minutes. Then, the electrode is dried under a reduced pressure atmosphere of −80 kPa for 1 hour at room temperature so that the electrode is not exposed to atmosphere. Then, in the same manner as described above, the active material layer is collected and measured.

The above-mentioned GC measurement is carried out for a battery or an electrode before the initial charge. In addition, the active material layer is taken from an electrode that is in a state having a potential within a range of 2.5 V to 3.5 V relative to metallic lithium. When the electrode active material layer collected from an electrode having a potential outside the above range, for example, such as an electrode in a state of charge, is measured, the resulting peaks will vary.

The existence form of carbon dioxide contained in the active material layer can be confirmed by the pyrolysis-gas chromatography/mass spectrometry (pyrolysis GC/MS). The pyrolysis GC/MS can be performed by using a device including gas chromatography (GC) equipped with a pyrolyzer and mass spectrometry (MS) directly connected to the GC. In the case where carbon dioxide is contained in the active material layer or in the case where a substance that causes the generation of carbon dioxide is present, a peak appears in a peak chart obtained by the pyrolysis GC/MS measurement. The pyrolysis GC/MS measurement can be carried out in the same manner as described for the GC measurement.

When the active material layer is subjected to the pyrolysis GC/MS measurement, two peaks appear in the range of between 120° C. and 350° C. These two peaks show that carbon dioxide exists in at least two different forms in the active material layer. Out of these two peaks, the peak at the low-temperature side is referred to as peak A, and the peak at the high-temperature side is referred to as peak B. The pyrolysis GC/MS was measured under a temperature rising condition of 5° C./minute.

When the active material layer was exposed to the dry atmosphere of carbon dioxide for a long time and then it was measured, the intensity of only peak A was increased. From this, it is thought that peak A of the low-temperature side indicates the state where carbon dioxide has been loosely, physically adsorbed onto the active material layer.

The physically adsorbed carbon dioxide in such a way influences greatly on gas generation. Therefore, it is preferred that such a carbon dioxide is present in a small amount. However, the physically adsorbed carbon dioxide reacts with moisture in the battery and lithium ion in the electrolyte, thereby to produce lithium carbonate. Therefore it is thought that it gives a dehydration effect. In addition, the resulting lithium carbonate promotes the formation of coatings. Accordingly, a small amount of carbon dioxide in a state of being physically adsorbed is preferred.

On the other hand, as a result of investigation by XRD or the like, it is considered that the peak B at the high temperature side is derived from the existence of another compound which is comprised of mainly lithium carbonate (for example, $Li_2CO_3$) rather than carbon dioxide. It should be noted, in this case, that lithium carbonate is intended to include lithium hydrogen carbonate ($(LiH)_2CO_3$) wherein a part of the lithium is substituted by H.

Carbon dioxide existing as such a compound may gasify by react with an acid component in the electrolyte. Therefore, it is preferable that such carbon dioxide exists in an amount as small as possible. However, carbon dioxide existing as a compound produces an inorganic coating. In addition, it is thought that such carbon dioxide promotes the production of an organic polymer, resulting in the formation of an organic-based coating. Thus, it is preferable that a small amount of carbon dioxide exists as the compound.

Based upon the foregoing, it is preferable that carbon dioxide contained in the active material layer includes both of the physically adsorbed carbon dioxide that is represented by the peak A and the carbon dioxide that exists as the compound represented by the peak B. In this case, when the peak intensity of the peak A is expressed as a and the peak intensity of the peak B is expressed as b, it is preferable to satisfy an expression $a \leq b$. The peak intensity ratio (a/b) is preferably 1 or less.

The carbon dioxide existing as the compound (that appears as peak B) produces an organic-based polymer coating. The organic-based polymer coating makes the reduction reaction of the physically adsorbed carbon dioxide (that appears as peak A) slow. Thus, the carbon dioxide existing as the compound decreases the amount of gas generated during storage. The relatively more organic-based polymer coating can effectively reduce the amount of gas generation. Therefore, if the peak intensity ratio (a/b) is 1 or less, gas generation is significantly suppressed. In addition, since a moderate coating is produced, self-discharge reaction is suppressed while maintaining a good rate performance. The peak intensity ratio (a/b) is typically 0.3 or more. In addition, it is more preferable that the peak intensity ratio (a/b) is 0.95 or less, and further preferable that the peak intensity ratio (a/b) is 0.9 or less.

In the case of the negative electrode active material layer, it is preferable that the peak A at the low-temperature side appears in the range of 120° C. or more and less than 200°

C., and the peak B at the high-temperature side appears in the range of 200° C. to 350° C. Here, the peak A is the highest intensity peak appearing in the range of 120° C. or more and less than 200° C. The peak B is the highest intensity peak appearing in the range of 200° C. to 350° C.

In addition, it is preferable that the negative electrode active material layer contains carbon dioxide in an amount that releases the carbon dioxide in the range of 0.1 ml to 5 ml per 1 g when heated at 350° C. for 1 minute.

When the two peaks are in the above range or the content of carbon dioxide is in the above range, gas generation during storage of batteries as well as self-discharge reaction can be effectively suppressed.

In the case of the positive electrode active material layer, it is preferable that the peak A at the low-temperature side appears in the range of 120° C. or more and less than 250° C., and the peak B at the high-temperature side appears in the range of 250° C. to 350° C. Here, the peak A is the highest intensity peak appearing in the range of 120° C. or more and less than 250° C. The peak B is the highest intensity peak appearing in the range of 250° C. to 350° C.

In addition, it is preferable that the positive electrode active material layer contains carbon dioxide in an amount that releases the carbon dioxide in the range of 0.5 ml to 10 ml per 1 g when heated at 350° C. for 1 minute.

When the two peaks are in the above range or the content of carbon dioxide is in the above range, gas generation during storage of batteries as well as self-discharge reaction can be effectively suppressed.

Since the electric potential of the positive electrode is different from that of the negative electrode, reduction speed of carbon dioxide in the vicinity of the positive electrode is slower compared to the negative electrode. It is also thought that a larger amount of lithium carbonate is required in order to produce a coating comprising an organic-base polymer at the positive electrode than at the negative electrode. Accordingly, in order to form a stable coating on the surface of the positive electrode and suppress gas generation effectively, it is preferable that the amount of carbon dioxide contained in the positive electrode is greater than that contained in the negative electrode.

A positive electrode and a negative electrode can be produced as follows. First, an active material, a conductive agent and a binder are suspended in a solvent to prepare a slurry. As the solvent, for example, N-methylethylpyrrolidone can be used. Next, the slurry is applied to a current collector and dried to form an active material layer. Then, the active material layer is rolled to produce an electrode.

The amount of carbon dioxide contained in the active material layer can be controlled by adjusting either of carbon dioxide concentration and moisture content in the atmosphere, and stirring time and dispersion strength of the slurry, in the step of preparing the slurry.

The amount of carbon dioxide that is physically adsorbed can be reduced and the intensity a of the peak A can be decreased particularly by reducing the concentration of carbon dioxide in the atmosphere. In addition, by reducing the amount of moisture in the atmosphere, it is possible to decrease the amount of carbon dioxide existing as a compound and then, the intensity b of the peak B can be reduced.

The carbon dioxide concentration in the atmosphere is preferably in the range of 0.003% to 0.03%. Further, the amount of moisture in the atmosphere is preferably within a range of a dew point equal to or less than −10° C. It should be noted that the dew point refers to a temperature at which a partial water vapor pressure in the air equals a saturation pressure, and as used herein, it is defined as a temperature at which a partial water vapor pressure in the air equals a saturation pressure when the temperature is lowered under a constant pressure.

If the concentration of carbon dioxide and the amount of moisture in the atmosphere are too high, carbon dioxide adsorbed on the surface of the negative electrode active material may react with lithium in the active material. As a result, lithium carbonate may be increased. If the moisture content in the atmosphere is too low, the intensity of the peak B is significantly reduced. As a result, a may become larger than b (i.e., a>b). Therefore, it is preferable to contain a moderate amount of moisture in the atmosphere. Typically, the dew point is preferably −20° C. or more.

In addition, ease of adsorption of carbon dioxide varies depending on the type of active materials. Thus, even by using a combination of different active materials, it is possible to adjust the content of carbon dioxide.

According to the above embodiments, a non-aqueous electrolyte secondary battery which shows a suppression of gas generation during its storage as well as a suppression of self-discharge reaction can be provided.

EXAMPLES

Example 1

Production of Negative Electrode

Lithium titanium oxide ($Li_4Ti_5O_{12}$) having a spinel structure and having a lithium absorption potential of 1.55 V (versus $Li/Li^+$) was used as a negative electrode active material. Ninety percent by mass of $Li_4Ti_5O_{12}$ powder, 5% by mass of graphite, and 5% by mass of PVdF were added to NMP and mixed to prepare a slurry. Preparation of the slurry was carried out under an atmosphere of a carbon dioxide concentration of 0.01% and a dew point of −10° C. The slurry was dispersed for 3 hours using zirconia beads.

The prepared slurry was applied to both surfaces of a current collector made from aluminum foil having a thickness of 11 μm, dried under the same atmosphere as in the preparation of slurry, and then pressed. In this way, a negative electrode having a negative electrode active material layer with a density of 2.0 g/cm$^3$ was produced.

<Production of Positive Electrode>

Lithium-nickel-cobalt oxide ($LiNi_{0.8}Co_{0.2}O_2$) was used as a positive electrode active material. Ninety-one percent by mass of $LiNi_{0.8}Co_{0.2}O_2$ powder, 2.5% by mass of acetylene black, 3% by mass of graphite, and 3.5% by mass of polyvinylidene fluoride (PVdF) were added to N-methylpyrrolidone and mixed to prepare a slurry. Preparation of the slurry was carried out under an atmosphere of a carbon dioxide concentration of 0.02% and a dew point of −13° C. The slurry was dispersed for 2 hours using zirconia beads.

The prepared slurry was applied to both surfaces of a current collector made from aluminum foil having a thickness of 15 μm, dried under the same atmosphere as in the preparation of slurry, and then pressed. In this way, a positive electrode having a positive electrode active material layer with a density of 3.0 g/cm$^3$ was produced.

<Production of Electrode Group>

A laminate was obtained by laminating the positive electrode produced above, a separator made of a porous polyethylene film having a thickness of 20 μm, the negative electrode produced above, and the separator in this order. This laminate was spirally wound so that the negative electrode was positioned on the outermost periphery, and then subjected to heating press at 90° C. In this way, a flat wound electrode group having 58 mm in width, 95 mm in height and 3.0 mm in thickness was produced. The obtained electrode group was accommodated in a container made of laminate film, and dried under vacuum at 80° C. for 24 hours. The laminate film was comprised of an aluminum foil having a thickness of 40 μm and a polypropylene layer formed on both surfaces of the aluminum foil, and had a thickness of 0.1 mm.

<Preparation of Non-Aqueous Electrolyte>

A mixed solvent was prepared by mixing ethylene carbonate (EC) and methyl ethyl carbonate (MEC) in a volume ratio of 1:2. Lithium hexafluorophosphate ($LiPF_6$) was dissolved in the mixed solvent at a concentration of 1.0 mol/L to prepare a non-aqueous electrolyte.

<Production of Battery>

The non-aqueous electrolyte was injected into a container in which an electrode group had been accommodated, and sealed to produce a secondary battery as shown in FIG. 1.

<Measurement of the Amount of Carbon Dioxide of Negative Electrode>

A negative electrode produced in the same manner as described above was dismantled and the negative electrode active material layer was subjected to GC measurement. First, the aluminum foil was peeled off from the negative electrode, and some of the active material layer was then collected under an inert gas atmosphere. A sample that had been collected was heated to 350° C. for 1 minute to measure the amount of carbon dioxide generated. As a result, it was confirmed that 2.4 ml of carbon dioxide per 1 g of the active material layer was generated.

Figure 3:
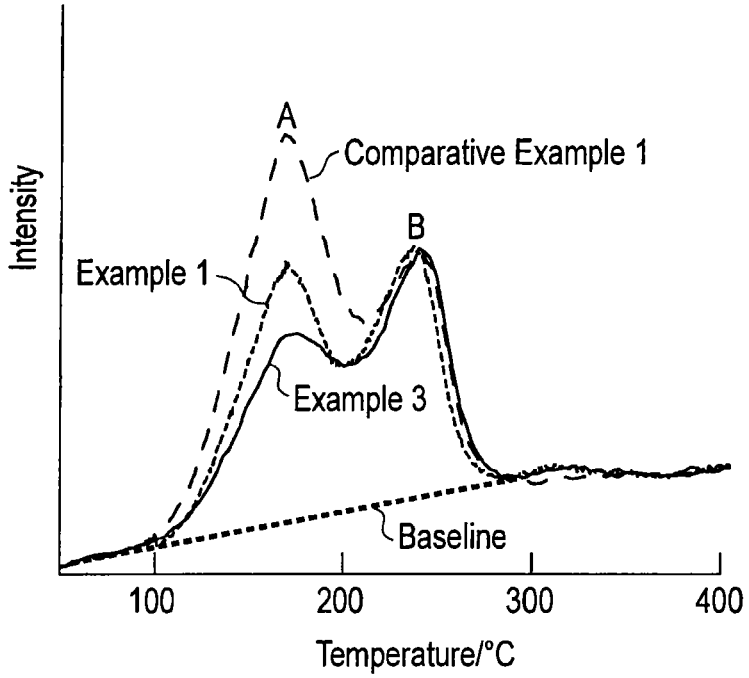
FIG. 3 is a measurement chart of the negative electrodes according to Examples and Comparative Example by pyrolysis GC/MS.

Further, a sample collected in the same manner as described above was subjected to the pyrolysis GC/MS measurement. The obtained peaks are shown in FIG. 3. As shown in FIG. 3, two peaks appeared in the range of 120° C. to 350° C. More specifically, peak B appeared at the high-temperature side of 200° C. or more, and peak Aappeared at the low-temperature side of less than 200° C. A baseline was drawn based on the peak of the low-temperature side, and values obtained by subtracting the baseline value from the intensities of the two peaks were measured. Using these values, the ratio (a/b) of peak A intensity (a) relative to peak Bintensity (b) was calculated. As a result, a/b was found to be 0.75.

<Measurement of the Amount of Carbon Dioxide of Positive Electrode>

A positive electrode produced in the same manner as described above was dismantled and the positive electrode active material layer was subjected to GC measurement. First, the aluminum foil was peeled off from the positive electrode, and some of the active material layer was then collected under an inert gas atmosphere. The sample that had been collected was heated to 350° C. for 1 minute to measure the amount of carbon dioxide generated. As a result, it was confirmed that 3.2 ml of carbon dioxide per 1 g of the active material layer was generated.

Figure 4:
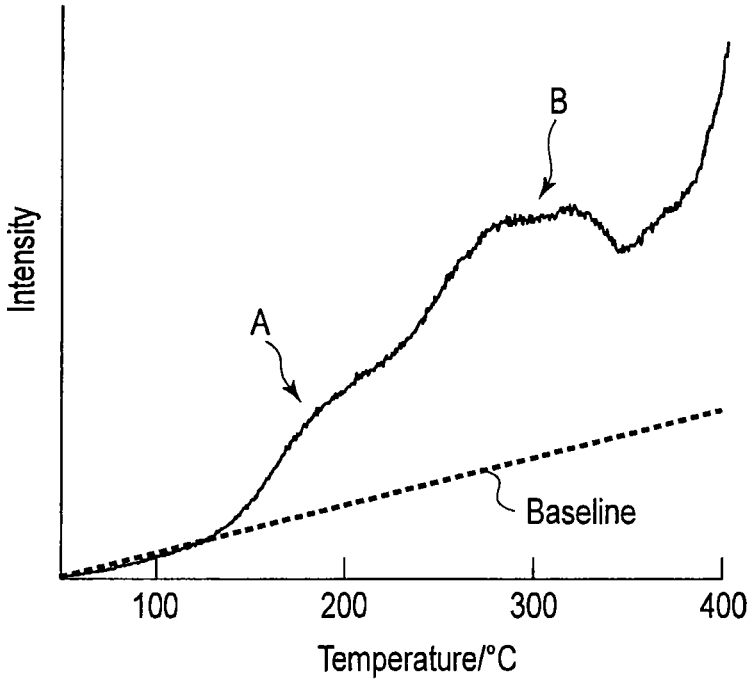
FIG. 4 is a measurement chart of the positive electrode according to Example 1 by pyrolysis GC/MS.

Further, a sample collected in the same manner as described above was subjected to the pyrolysis GC/MS measurement. The obtained peaks are shown in FIG. 4. As shown in FIG. 4, two peaks appeared in the range of 120° C. to 350° C. More specifically, peak B appeared at the high-temperature side of 250° C. or more, and peak Aappeared at the low-temperature side of less than 250° C. A baseline was drawn based on the peak of the low-temperature side, and values obtained by subtracting the baseline value from the intensities of the two peaks were measured. Using these values, the ratio (a/b) of peak A intensity (a) relative to peak Bintensity (b) was calculated. As a result, a/b was found to be 0.71.

Examples 2 to 15

A secondary battery was produced in the same manner as in Example 1, except that the atmosphere and the conditions in the production of the slurry for the positive electrode and the negative electrode were changed. The positive electrode active material and the negative electrode active material were used as listed in Table 1 and Table 2. For each electrode, the measurement was performed in the same manner as in Example 1. The amount of carbon dioxide, the existence of two or more peaks in the range of 120° C. to 350° C., and the peak intensity ratio (a/b) were shown in Table 1 and Table 2.

Comparative Example 1

A secondary battery was produced in the same manner as in Example 1, except that the concentration of carbon dioxide was 0.08% in the atmosphere in the production of the slurry for the positive electrode and the negative electrode. Each electrode was measured in the same manner as in Example 1. The results were shown in Table 1 and Table 2.

Comparative Example 2

A secondary battery was produced in the same manner as in Example 1, except that the atmosphere in the production of the slurry for the positive electrode and the negative electrode was changed to an environment where humidity was not controlled (dew point of 14° C.) and moisture content was increased. Each electrode was measured in the same manner as in Example 1. The results were shown in Table 1 and Table 2.

Comparative Example 3

A secondary battery was produced in the same manner as in Example 1, except that the atmosphere in the production of the slurry for the positive electrode and the negative electrode was changed to a nitrogen atmosphere. Each electrode was measured in the same manner as in Example 1. The results were shown in Table 1 and Table 2.

(Results)

TABLE 1

| | Negative electrode | | | |
|---|---|---|---|---|
| | Negative electrode active material | Amount of carbon dioxide | Existence of two peaks | Peak intensity ratio (a/b) |
| Example 1 | $Li_4Ti_5O_{12}$ | 2.4 ml | Appeared | 0.75 |
| Example 2 | $Li_4Ti_5O_{12}$ | 0.1 ml | Appeared | 0.68 |
| Example 3 | $Li_4Ti_5O_{12}$ | 5.0 ml | Appeared | 0.98 |
| Example 4 | $Li_4Ti_5O_{12}$ | 2.4 ml | Appeared | 0.75 |
| Example 5 | $Li_4Ti_5O_{12}$ | 2.4 ml | Appeared | 0.75 |
| Example 6 | $Li_4Ti_5O_{12}$ | 3.2 ml | Appeared | 0.98 |
| Example 7 | $Li_4Ti_5O_{12}$ | 3.1 ml | Appeared | 0.31 |
| Example 8 | $Li_4Ti_5O_{12}$ | 2.4 ml | Appeared | 0.75 |
| Example 9 | $Li_4Ti_5O_{12}$ | 2.4 ml | Appeared | 0.75 |
| Example 10 | $Li_4Ti_5O_{12}$ | 1.2 ml | Appeared | 0.65 |
| Example 11 | $Li_4Ti_5O_{12}$ | 1.2 ml | Appeared | 0.65 |
| Example 12 | $Li_4Ti_5O_{12}$ | 1.2 ml | Appeared | 0.65 |

TABLE 1-continued

| | Negative electrode | | | |
|---|---|---|---|---|
| | Negative electrode active material | Amount of carbon dioxide | Existence of two peaks | Peak intensity ratio (a/b) |
| Example 13 | $Li_4Ti_5O_{12}$ | 1.2 ml | Appeared | 0.65 |
| Example 14 | $Li_4Ti_5O_{12}$ | 1.2 ml | Appeared | 0.65 |
| Example 15 | $Li_4Ti_5O_{12}$ | 1.2 ml | Appeared | 0.65 |
| Comparative Example 1 | $Li_4Ti_5O_{12}$ | 6.5 ml | Appeared | 1.56 |
| Comparative Example 2 | $Li_4Ti_5O_{12}$ | 9.8 ml | Not identified | — |
| Comparative Example 3 | $Li_4Ti_5O_{12}$ | 0.02 ml | Appeared | 2.3 |

TABLE 2

| | Positive electrode | | | |
|---|---|---|---|---|
| | Positive electrode active material | Amount of carbon dioxide | Existence of two peaks | Peak intensity ratio (a/b) |
| Example 1 | $Li(Ni_{0.8}Co_{0.2})O_2$ | 3.2 ml | Appeared | 0.71 |
| Example 2 | $Li(Ni_{0.8}Co_{0.2})O_2$ | 3.2 ml | Appeared | 0.71 |
| Example 3 | $Li(Ni_{0.8}Co_{0.2})O_2$ | 3.2 ml | Appeared | 0.71 |
| Example 4 | $Li(Ni_{0.8}Co_{0.2})O_2$ | 0.5 ml | Appeared | 0.38 |
| Example 5 | $Li(Ni_{0.8}Co_{0.2})O_2$ | 10 ml | Appeared | 0.95 |
| Example 6 | $Li(Ni_{0.8}Co_{0.2})O_2$ | 3.2 ml | Appeared | 0.68 |
| Example 7 | $Li(Ni_{0.8}Co_{0.2})O_2$ | 3.2 ml | Appeared | 0.68 |
| Example 8 | $Li(Ni_{0.8}Co_{0.2})O_2$ | 6.8 ml | Appeared | 0.93 |
| Example 9 | $Li(Ni_{0.8}Co_{0.2})O_2$ | 7.0 ml | Appeared | 0.55 |
| Example 10 | $Li(Ni_{0.4}Mn_{0.4}Co_{0.2})O_2$ | 2.8 ml | Appeared | 0.86 |
| Example 11 | $Li(Ni_{0.7}Mn_{0.2}Co_{0.1})O_2$ | 1.4 ml | Appeared | 0.55 |
| Example 12 | $Li(Ni_{0.7}Mn_{0.2}Co_{0.1})O_2$ $LiMn_2O_4$ 1:1 mix | 0.9 ml | Appeared | 0.78 |
| Example 13 | $Li(Mn_{0.95}Al_{0.05})_2O_4$ | 1.0 ml | Appeared | 0.68 |
| Example 14 | $LiFePO_4$ | 0.8 ml | Appeared | 0.85 |
| Example 15 | $Li(Ni_{0.8}Co_{0.2})O_2$ $LiFePO_4$ 2:1 mix | 0.9 ml | Appeared | 0.88 |
| Comparative Example 1 | $Li(Ni_{0.8}Co_{0.2})O_2$ | 11.6 ml | Appeared | 1.8 |
| Comparative Example 2 | $Li(Ni_{0.8}Co_{0.2})O_2$ | 25 ml | Not identified | — |
| Comparative Example 3 | $Li(Ni_{0.8}Co_{0.2})O_2$ | 0.2 ml | Appeared | 3.2 |

In all of Examples 1 to 15, each amount of carbon dioxide in both of the positive electrode and the negative electrode was lower than that in Comparative Examples 1 and 2. In addition, two peaks were confirmed in the range of 120° C. to 350° C. In any of Examples 1 to 15, the ratio a/b was smaller than 1. Namely, the peak A intensity (a) of the lower-temperature side was smaller than the peak B intensity (b) of the high-temperature side.

The amount of carbon dioxide in each of the positive electrode and the negative electrode of Comparative Example 1 was large. Further, the ratio a/b was larger than 1. In other words, the peak Aintensity (a) of the lower-temperature side was greater than the peak B intensity (b) of the high-temperature side. The positive electrode and the negative electrode of Comparative Example 1 were produced under the condition of a high concentration of carbon dioxide. Thus, it was shown that the amount of physically adsorbed carbon dioxide was increased if the concentration of carbon dioxide in the atmosphere was high.

The peak A of the lower-temperature side was not confirmed in the range of 120° C. to 350° C. in any of the positive electrode and the negative electrode of Comparative Example 2. The positive electrode and the negative electrode of Comparative Example 2 were produced under a high humidity atmosphere. It is thought that Carbon dioxide adsorbed on the active material reacted with moisture in the production of the electrode and changed into lithium carbonate, thereby the peak A was decreased.

The amount of carbon dioxide was small in Comparative Example 3, which was produced under a nitrogen atmosphere.

(Storage Test)

As for the secondary batteries obtained in Examples 1 to 15 and Comparative Examples 1 to 3, the thickness of each battery at SOC 50% was measured. Then, the battery was charged at 1 C rate to 30%-charged state, and stored under an environment of 65° C. for one month. The battery after storage was discharged again at 1 C rate without charging under the environment of 25° C., and the remaining capacity of the battery was measured. The capacity after storage relative to the capacity before storage was calculated, and then a capacity retention ratio was calculated.

Then, after charge and discharge at 1 C rate was conducted once, the battery was adjusted to SOC 50% again. The thickness was measured at this state, and then, the change ratio of the thickness was calculated based on the thickness before storage. These results are shown in Table 3 below.

TABLE 3

| | Thickness change ratio | Capacity retention ratio |
|---|---|---|
| Example 1 | 108% | 87% |
| Example 2 | 101% | 92% |
| Example 3 | 115% | 86% |
| Example 4 | 102% | 88% |
| Example 5 | 112% | 80% |
| Example 6 | 110% | 81% |
| Example 7 | 106% | 90% |
| Example 8 | 108% | 85% |
| Example 9 | 103% | 88% |
| Example 10 | 102% | 90% |
| Example 11 | 101% | 88% |
| Example 12 | 102% | 85% |
| Example 13 | 101% | 84% |
| Example 14 | 102% | 85% |
| Example 15 | 102% | 86% |
| Comparative Example 1 | 160% | 72% |
| Comparative Example 2 | 210% | 85% |
| Comparative Example 3 | 100% | 65% |

The thickness after storage of the non-aqueous electrolyte secondary batteries of Examples 1 to 15 almost did not increase. In addition, the capacity retention ratio of these batteries was higher than that of Comparative Examples 1 and 3. Therefore, the batteries of Examples 1 to 15 were shown to have a small amount of gas generation during storage and a little amount of self-discharge during storage.

In Comparative Example 1, much gas generation occurred and the capacity retention ratio was also low. Thus, in the case of a>b, much self-discharge was shown.

In Comparative Example 2, it was found that the capacity retention ratio was high, but the change ratio of the thickness was large. Thus, it was shown that a large amount of gas was generated.

In Comparative Example 3, there was no change in the thickness of the battery, but the capacity retention ratio was low. Thus, if the amount of carbon dioxide is too low, it was shown that formation of a coating became difficult and the amount of self-discharge was increased.

(Measurement Chart of Pyrolysis GC/MS)

The measurement results of pyrolysis GC/MS for the negative electrode of each of Example 1, Example 3, and Comparative Example 1 are shown in FIG. 3. As shown in FIG. 3, two peaks appeared in the range of 120° C. to 350° C. Comparative Example 1 prepared in an atmosphere of a high concentration of carbon dioxide showed a significantly high intensity of peak A of the low-temperature side. Example 3 showed the lower intensity of peak A of the low-temperature side than Example 1. This is because the amount of moisture in the atmosphere at the time of preparation of the slurry was low.

FIG. 4 is a measurement chart of pyrolysis GC/MS for the positive electrode of Example 1. As shown in FIG. 4, the peak in the chart for the positive electrode is somewhat lacking clarity. The positive electrode active material contained a transition metal such as Ni, Mn, and Co. It is considered that the influence of such a metal was appeared. The peak chart of the positive electrode using lithium manganese composite oxide, lithium nickel composite oxide, or lithium composite phosphate compound, respectively, showed similar behavior to each other. In addition, the two peaks were observed in the higher temperature side compared with the negative electrode. It is considered that these facts may be caused by the transition metal species contained in the active material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of producing a non-aqueous electrolyte secondary battery, comprising:

preparing a slurry comprising an electrode active material under an atmosphere having a carbon dioxide concentration in the range of 0.003% to 0.03%, an amount of moisture in the atmosphere being within a range of a dew point equal to or less than −10° C., the dew point being a temperature at which a partial water vapor pressure in the atmosphere equals a saturation pressure when a temperature is lowered under a constant pressure;

forming an active material layer on a current collector from the slurry to obtain an electrode; and assembling a non-aqueous electrolyte secondary battery comprising the electrode, wherein the active material layer contains carbon dioxide and releases the carbon dioxide in the range of 0.1 ml to 10 ml per 1 g when heated at 350° C. for 1 minute.

2. The method according to claim 1, wherein the active material layer shows two peaks appearing in the range of 120° C. to 350° C. in the pyrolysis-gas chromatography/mass spectrometry under a temperature rising condition of 5° C./minute, and an inequality $a \leq b$ is satisfied where $a$ is a peak intensity of the low-temperature side of the two peaks and $b$ is a peak intensity of the high-temperature side of the two peaks.

3. The method according to claim 2, wherein the electrode active material is a lithium titanium composite oxide, the active material layer is a negative electrode active material layer; and the negative electrode active material layer shows two peaks appearing in the range of 120° C. to 350° C. in the pyrolysis-gas chromatography/mass spectrometry under a temperature rising condition of 5° C./minute, and the peak of the low-temperature side of the two peaks appears in the range of 120° C. or more and less than 200° C. and the peak of the high-temperature side appears in the range of 200° C. to 350° C.

4. The method according to claim 3, wherein the negative electrode active material layer releases carbon dioxide in the range of 0.1 ml to 5 ml per 1 g when heated at 350° C. for 1 minute.

5. The method according to claim 2, wherein the the electrode active material comprises at least one oxide selected from the group consisting of lithium manganese composite oxide, lithium nickel composite oxide and lithium composite phosphate compound, the active material layer is a positive electrode active material layer; and the positive electrode active material layer shows two peaks appearing in the range of 120° C. to 350° C. in the pyrolysis-gas chromatography/mass spectrometry under a temperature rising condition of 5° C./minute, and the peak of the low-temperature side of the two peaks appears in the range of 120° C. or more and less than 250° C. and the peak of the high-temperature side appears in the range of 200° C. to 350° C.

6. The method according to claim 5, wherein the positive electrode active material layer releases carbon dioxide in the range of 0.5 ml to 10 ml per 1 g when heated at 350° C. for 1 minute.

7. The method according to claim 2, comprising:

forming the negative electrode active material layer from a slurry comprising a lithium titanium composite oxide; and forming the positive electrode active material layer from a slurry comprising at least one an oxide selected from the group consisting of lithium manganese composite oxide, lithium nickel composite oxide and lithium composite phosphate compound, wherein the negative electrode active material layer shows two peaks appearing in the range of 120° C. to 350° C. in the pyrolysis-gas chromatography/mass spectrometry under a temperature rising condition of 5° C./minute, and the peak of the low-temperature side of the two peaks appears in the range of 120° C. or more and less than 200° C. and the peak of the high-temperature side appears in the range of 200° C. to 350° C.;

the positive electrode active material layer shows two peaks appearing in the range of 120° C. to 350° C. in the pyrolysis-gas chromatography/mass spectrometry under a temperature rising condition of 5° C./minute, and the peak of the low-temperature side of the two peaks appears in the range of 120° C. or more and less than 250° C. and the peak of the high-temperature side appears in the range of 200° C. to 350° C.

8. The method according to claim 1, wherein the electrode active material comprises a lithium titanium composite oxide.

9. The method according to claim 1, wherein the current collector is aluminum foil, an aluminum alloy foil containing one or more elements selected from the group consisting of Mg, Ti, Zn, Mn, Fe, Cu and Si, or a copper foil.

10. The method according to claim 1, wherein the electrode active material is a lithium titanium composite oxide.

11. The method according to claim 1, wherein the electrode active material is lithium titanate ($Li_{4+x}Ti_5O_{12}$) having a spinel structure, and lithium titanate ($Li_{2+x}Ti_3O_7$) having a ramsdellite structure.

12. The method according to claim 1, wherein the electrode active material is $Li_4Ti_5O_{12}$.

*13. A method of producing an electrode for a non-aqueous electrolyte secondary battery, comprising:*

*preparing a slurry comprising an electrode active material under an atmosphere having a carbon dioxide concentration in a given range and having an amount of moisture with a dew point being equal to or less than 10° C. so that the slurry contains a given amount of carbon dioxide, wherein the dew point is a temperature at which a partial water vapor pressure in the atmosphere equals a saturation pressure when a temperature is lowered under a constant pressure; and*

*forming an active material layer on a current collector from the slurry to obtain the electrode,*

*wherein the given amount of carbon dioxide is an amount that the active material layer releases the carbon dioxide contained therein in a range of 0.1 ml to 10 ml per 1 g when heated at 350° C. for 1 minute.*

*14. The method according to claim 13, wherein the active material layer shows two peaks appearing in the range of 120° C. to 350° C. in the pyrolysis-gas chromatography/mass spectrometry under a temperature rising condition of 5° C./minute, and 20 an inequality a≤b is satisfied where a is a peak intensity of the low-temperature side of the two peaks and b is a peak intensity of the high-temperature side of the two peaks.*

*15. The method according to claim 14, wherein*

*the electrode active material is a lithium titanium composite oxide,*

*the active material layer is a negative electrode active material layer, and*

*the negative electrode active material layer shows two peaks appearing in the range of 120° C. to 350° C. in the pyrolysis-gas chromatography/mass spectrometry under a temperature rising condition of 5° C./minute, and the peak of the low-temperature side of the two peaks appears in the range of 120° C. or more and less than 200° C. and the peak of the high-temperature side appears in the range of 200° C. to 350° C.*

*16. The method according to claim 15, wherein the negative electrode active material layer releases carbon dioxide in the range of 0.1 ml to 5 ml per 1 g when heated at 350° C. for 1 minute.*

*17. The method according to claim 14, wherein*

*the electrode active material comprises at least one oxide selected from the group consisting of lithium manganese composite oxide, lithium nickel composite oxide and lithium composite phosphate compound,*

*the active material layer is a positive electrode active material layer, and*

*the positive electrode active material layer shows two peaks appearing in the range of 120° C. to 350° C. in the pyrolysis-gas chromatography/mass spectrometry under a temperature rising condition of 5° C./minute, and the peak of the low-temperature side of the two peaks appears in the range of 120° C. or more and less than 250° C. and the peak of the high-temperature side appears in the range of 200° C. to 350° C.*

*18. The method according to claim 13, wherein the electrode active material comprises a lithium titanium composite oxide.*

*19. The method according to claim 13, wherein the current collector is aluminum foil, an aluminum alloy foil containing one or more elements selected from the group consisting of Mg, Ti, Zn, Mn, Fe, Cu and Si, or a copper foil.*

*20. The method according to claim 13, wherein the electrode active material is a lithium titanium composite oxide.*

*21. The method according to claim 13, wherein the electrode active material is lithium titanate (Li4+xTi5O12) having a spinel structure, and lithium titanate (Li2+xTi3O7) having a ramsdellite structure.*

*22. The method according to claim 13, wherein the electrode active material is $Li_4T_{15}O_{12}$.*

*23. The method according to claim 13, wherein the given range regarding the carbon dioxide concentration is 0.003% to 0.03%.*

*24. An electrode for a non-aqueous electrolyte secondary battery prepared by a process, comprising:*

*suspending, to prepare a slurry, an active material, a conductive agent, and a binder in a solvent in an atmosphere having a carbon dioxide concentration in a given range and having an amount of moisture with a dew point being equal to or less than −10° C. so that the slurry contains a given amount of carbon dioxide, wherein the dew point is a temperature at which a partial water vapor pressure in the atmosphere equals a saturation pressure when a temperature is lowered under a constant pressure;*

*applying the slurry to a current collector; and*

*drying the current collector to which the slurry is applied to form an active material layer;*

*wherein the given amount of carbon dioxide is an amount that the active material layer releases the carbon dioxide contained therein in a range of 0.1 ml to 10 ml per 1 g when heated at 350° C. for 1 minute.*

*25. The electrode according to claim 24, wherein the active material comprises a lithium titanium composite oxide.*

*26. The electrode according to claim 24, wherein the current collector is aluminum foil, an aluminum alloy foil containing one or more elements selected from the group consisting of Mg, Ti, Zn, Mn, Fe, Cu and Si, or a copper foil.*

*27. The electrode according to claim 24, wherein the active material is a lithium titanium composite oxide.*

*28. The electrode according to claim 24, wherein the electrode active material is lithium titanate (Li4+xTi5O12) having a spinel structure, and lithium titanate (Li2+xTi3O7) having a ramsdellite structure.*

*29. The electrode according to claim 24, wherein the electrode active material is $Li_4T_{15}O_{12}$.*

*30. The electrode according to claim 24, wherein the given range regarding the carbon dioxide concentration is 0.003% to 0.03%.*

* * * * *